UNITED STATES PATENT OFFICE.

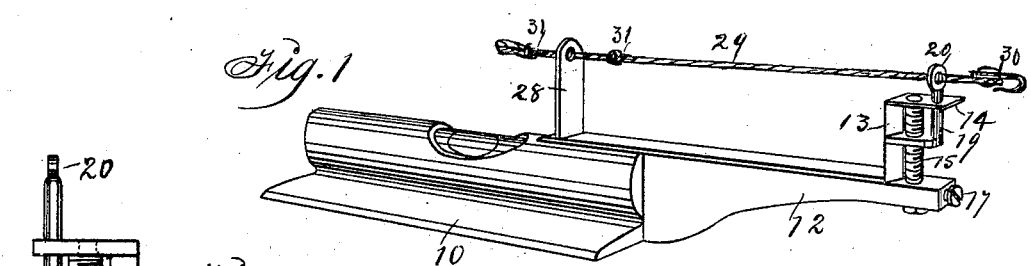

WILLIAM F. COOK, OF DES MOINES, IOWA.

APPARATUS FOR LEVELING AND MEASURING THE GRADE OF SURFACES.

SPECIFICATION forming part of Letters Patent No. 695,145, dated March 11, 1902.

Application filed December 31, 1901. Serial No. 87,881. (No model.)

*To all whom it may concern:*

Be it known that I, WILLIAM F. COOK, a citizen of the United States, residing at Des Moines, in the county of Polk and State of Iowa, have invented a new and useful Apparatus for Leveling and Measuring the Grade of Surfaces, of which the following is a specification.

My object is to save time and labor in making foundations and walls and grades of inclinations in the top surfaces of walls, floors, or other areas that extend ten feet or more in any direction from any given point of elevation.

My invention consists in the apparatus composed of a spirit-level, an adjustable support connected with the level, a line and a tension device for holding, supporting, and stretching different lengths of the line at different times between points that are to be on a level with each other and the space between them made level or graded, and the different parts are constructed and coöperated as hereinafter set forth, pointed out in my claims, and illustrated in the accompanying drawings, in which—

Figure 1 is a perspective view showing a spirit-level and adjustable support combined as required for practical use in operating the apparatus. Fig. 2 is an enlarged detail view of the adjustable support, partly in section. Fig. 3 shows the line-tension device, partly in section. Fig. 4 shows the invention in position as required to mark two distant points on a level line for building a wall that may vary from ten to one hundred feet in length. Fig. 5 is a plan view for marking four or more distant points on a level line as required in building foundations for buildings or leveling walls of buildings at any point of elevation desired.

The numeral 10 designates the flat-bottomed metal base of a spirit-level of common form. An extension 12, formed on or fixed to one end of the spirit-level, has a perpendicular post 13 and a right-angled extension 14 at its top. The end of the extension 12 has a perpendicular bore that is intersected by a horizontal screw-threaded bore, as clearly shown in Fig. 2. A screw 15 is extended up through the perpendicular bore and rotatably fitted in a bearing in the top of the right-angled extension 14. The lower end of the screw has a continuous groove 16 and is prevented from moving longitudinally by a screw 17, fitted in the bore or screw-seat that intersects the perpendicular bore in the end of the extension 12 on the end of the spirit-level 10, an elbow-shaped support 19 to retain the spirit-level in position relative to a stretched line as required to mark the level established by the cord, a line and spirit-level between two points distant from each other. It has an internal screw-thread in its horizontal portion, through which the screw 15 extends, and the perpendicular part projects up through an aperture in the part 14 and is provided with an eye 20, through which a cord can be passed, as shown in Figs. 1, 4, and 5. It is fitted to the part 13, as required, to prevent it from turning. A tube 21 has a small fixed ring 22 at its closed end and is open at its other end and provided with a straight longitudinal slot 23 along its central portion. A tube 24, having a fixed ring 25 at its closed end, is open at its other end and fitted in the tube 21 and slidably connected therewith by means of a coil-spring 25, that has one of its ends fixed to the closed end of the tube 21 and its other end to the closed end of the tube 24.

A scale representing feet by numerals is fixed on the tube 21 at one side of the slot 25, and a pointer 27 is fixed to the tube 24 to traverse the slot as required to indicate the tension of the measuring and leveling line and corresponds with knots or beads on the line that indicates the distance of the space over which the line has been stretched from one fixed stake or point to another that are to be leveled with each other.

A post 28 is fixed on top of the spirit-level at its center of gravity and provided with an aperture at its top, and a short length of cord 29 is extended through the perforation and also through the eye 20 in the top of the part 19, and a hook 30, fixed to one end of the cord and the other end of the cord passed through a perforation in the ring 22, and secured thereto by means of a knot in the end of the cord or in any suitable way, as required to permanently connect the cord with the tension regulating and leveling device. Knots 31 in the cord 29 on the opposite sides of the post 28 restrict the longitudinal movements of the cord, and jointly the knots on the cord serve to keep the spirit-level in proper position on the cord 29 while the apparatus is in use. A line 32 is provided with knots or beads 33 ten feet apart for use in connection with the leveling apparatus for the purpose of indicating the length of line at different times as represented by the pointer 27 and the scale on the tube 21.

It is obvious more force must be applied to stretch a long length of line than a short one and that the person applying the force must pull until the pointer 27 rests at the figures of the scale indicating the number of feet of line in use. For instance, if the operator was using ten feet of line he would have attached the hook 30 at the first bead on the line and then pull on the tension device until the pointer 27 reached the number "10" on the scale, then raise or lower his end, as the case might be until the line becomes level. If the distance was twenty, fifty, or one hundred feet, the operation would be the same. The hook being attached at the fifth bead, there would be fifty feet of line in use, and a harder pull would be required to make the sag of the line proportionately the same as it was at ten feet, and the operator would pull until the indicator reached number "50" on the scale and then proceed to level as before. The same rule applies to any distance from ten to one hundred feet.

It is obvious that in order to produce the results contemplated the suspended spirit-level must be balanced on the cord 29 at the post 28 and kept in a relative position to the cord 29 by the support 19 after the line 31 has been attached to the hook 30 and pulled taut, and if the ends of the line 31 are on a level, and in order to regulate or change the spirit-level relative to the cord 29 when stretched on a level line, the support 19 is raised or lowered by simply rotating the screw 15. It is also obvious that when a line is fastened at one point, different points in a foundation, or top surface of a wall or area it may be leveled by stretching the line to different corners or points, as indicated by dotted lines in Fig. 5, without releasing or moving the end of the line where it is fixed to a starting-point. It is also obvious that in locating pipes in buildings where two different points are separated by a wall or other obstruction through which a pipe is to be extended for conveying steam and returning water of condensation through the same pipe the proper inclination may be readily determined by stretching a line from the one point to the other and through the opening in which the pipe is to be located, as required, to extend between two points that are not on a level.

Having thus described the purpose, construction, and operation of my invention, its practical utility will be readily understood by persons familiar with the art to which it pertains, and

What I claim as new, and desire to secure by Letters Patent, is—

1. In an apparatus for leveling surfaces, a spirit-level having an extension at one end, a perpendicular post near the end of the extension, a right-angled projection at the top of the post, a screw extended up through a vertical bore in the extension and rotatably connected with the right-angled extension of the post and provided with a groove around its lower end, a screw seated in the end of said extension to enter the said groove in the screw, an elbow-shaped support, having an internal screw-thread in its horizontal position and an eye at its top and a post fixed at the center of gravity on top of the spirit-level and provided with an aperture at its top, arranged and combined to operate in the manner set forth for the purposes stated.

2. An apparatus for leveling walls and surfaces comprising a spirit-level having an extension at one end, a perpendicular post at its top and center of gravity provided with an aperture at its top and a perpendicular post, at the end of the extension, having a horizontal projection, a screw having a groove around its lower end extended up through the end of the extension and rotatably connected with the horizontal projection of the post, a screw seated in the end of the extension to enter the groove on the screw, an elbow-shaped support having an internal screw in its horizontal portion and an eye in the top of its vertical portion, a cord extended through the eye of the support and the aperture in the top of the post on the spirit-level, knots in the cord on opposite sides of the post and a hook on one end and a tension device on the other end, consisting of a tube having means for fastening the cord to its closed end and a longitudinal slot and scale, a second tube fitted in the open end of the first-mentioned tube, a coil-spring fixed to the closed ends of the two tubes, a pointer on the inner tube projecting through the slot in the outer tube, means for pulling on the closed end of the inner tube and a line having knots or beads at equal distances apart, arranged and combined to operate in the manner set forth for the purposes stated.

WILLIAM F. COOK.

Witnesses:
R. G. ORWIG,
THOMAS G. ORWIG.